United States Patent [19]
Morley et al.

[11] 3,751,695  
[45] Aug. 7, 1973

[54] ONE-WAY DIRECTIONAL CONTROL MEANS FOR SYNCHRONOUS A.C. MOTORS

[75] Inventors: Edwin Richard Morley, Two Rivers; Gerald Frederick Schmidt, Manitowoc, both of Wis.

[73] Assignee: AMF Incorporated, White Plains, N.J.

[22] Filed: Mar. 24, 1972

[21] Appl. No.: 237,868

[52] U.S. Cl. .................................. 310/41, 310/156
[51] Int. Cl. .............................................. H02k 7/10
[58] Field of Search ...................... 310/41, 66, 162, 310/163, 164, 156

[56] References Cited
UNITED STATES PATENTS

| | | | |
|---|---|---|---|
| 3,525,888 | 8/1970 | Linn | 310/41 |
| 3,558,940 | 1/1971 | Chesnut | 310/41 |
| 3,539,844 | 11/1970 | Linn | 310/41 |
| 3,501,656 | 3/1970 | Morley | 310/41 |
| 3,416,014 | 12/1968 | Kuzara | 310/41 |

*Primary Examiner*—R. Skudy  
*Attorney*—George W. Price et al.

[57] ABSTRACT

A synchronous A.C. motor having rotor means and a stator means which has included therewith fixed abutment means. The rotor means includes a rotatable rotor shaft having a radially extending cam fixed on one end thereof, and a rotor rotatable on the shaft and having an elongated stop member pivotably mounted thereon. Upon rotation of the rotor in one direction the elongated stop member engages the cam means and the stop member is positioned to its extended position in which it engages the abutment means to stop the rotor. Upon rotation of the rotor in the opposite direction the elongated stop member engages the cam means and the stop member is positioned to its retracted position in which it interlocks the rotor and shaft to permit rotation of shaft and rotor in unison.

6 Claims, 6 Drawing Figures

PATENTED AUG 7 1973 3,751,695

PATENTED AUG 7 1973 3,751,695

ONE-WAY DIRECTIONAL CONTROL MEANS FOR SYNCHRONOUS A.C. MOTORS

This invention relates generally to synchronous A.C. motors and more particularly to such motors having directional control devices.

In synchronous A.C. motors of the types embodied in clocks and time switch controls and the like when first energized normally have rotors which are capable of starting to rotate either clockwise or counterclockwise depending in each instance upon the polarity of the first half cycle of the energizing A.C. current and the position of the rotor. To prevent the rotors of such motors from rotating opposite to the direction desired, many arrangements have been proposed and used with limited success and acceptance.

An object of the present invention is to provide a synchronous A.C. motor with improved means for preventing the rotor thereof from turning in a direction opposite to that which is desired.

Another object of the present invention is to provide the foregoing motor with such direction control means which is positively operated by the rotor in response to the initial driving force of the energizing current.

And another object of the present invention is to provide the foregoing motor and directional control which requires no spring or biasing means.

The present invention contemplates a synchronous A.C. motor having stator means and rotor means limited to rotation in one predetermined direction. The stator means includes a coil means with a tubular body portion, a pole piece disposed at each end of the coil means providing an annular series of spaced salient stator poles extending therefrom axially within the body portion, a bearing means at one end of the coil extending axially within the series of stator poles toward the other end of the coil, and at least one abutment means extending from the end of the coil means opposite from the bearing means. The rotor means includes a shaft rotatably supported by the bearing means and a permanent magnet rotor mounted on and rotatable relative to the shaft. A cam means is provided at the end of the shaft and a cam follower/stop member is pivotally connected to the rotor. Rotation of the rotor in an undesired direction will cause the cam to move the stop member to a position to engage the abutment means and prevent the rotor from further rotation. Rotation of the rotor in a desired direction causes the cam to engage and move the stop member to a retracted position where it cannot engage the abutment means and the rotor is permitted to be driven. With the stop member in its retracted position, it with the cam forms a lost motion interlock between the rotor and rotor shaft.

The foregoing and other objects and advantages will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1:
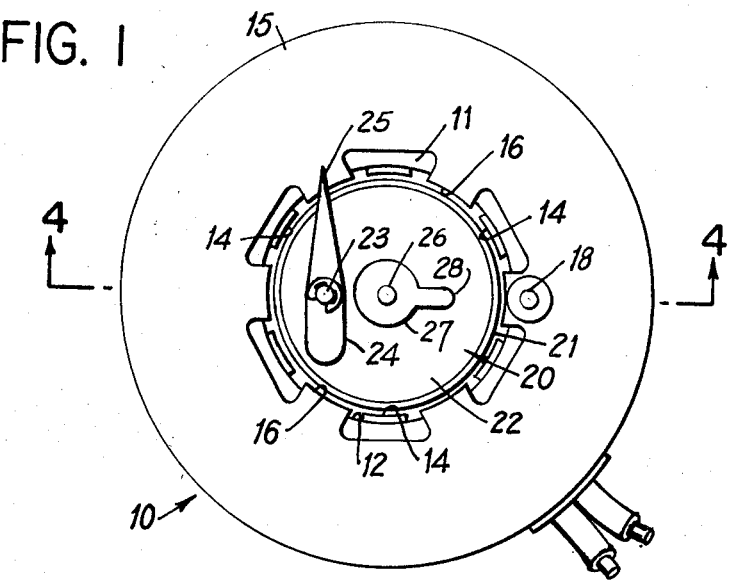
FIGS. 1, 2 and 3 are plan views of a motor made in accordance with the present invention with directional control means thereof in different positions.
Figure 4:
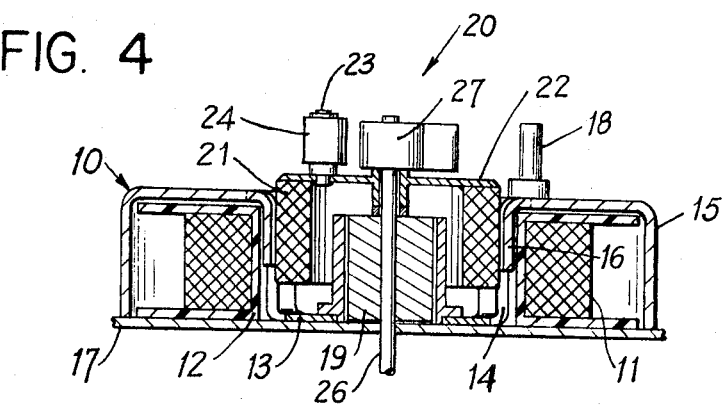
FIG. 4 is a sectional view taken on line 4—4 of FIG. 1.

Referring now to the drawings and particularly to FIGS. 1 and 4, the description of a motor in accordance with the present invention will be limited to the stator means or assembly 10 and the rotor means or assembly 20. The usual gear box and the gear train therein is not shown and will not be described except for a small portion of the gear box wall 17 as shown in FIG. 4.

The stator means 10 is provided with a coil 11 including a bobbin with a tubular wall 12, and two pole pieces 13 and 15 of magnetic material each disposed adjacent a different end of the coil. The pole pieces 13 and 15 are provided with a plurality of spaced salient poles or pole fingers 14 and 16, respectively, which extend axially within the tubular wall 12 and into the spaces between adjacent poles of the other pole piece thereby forming a spaced circular series of salient stator poles which extend alternately from one pole piece then the other.

The pole piece 15 is preferably in the form of a cup or cover, as best shown in FIG. 4, with its annular wall encircling the coil 11 and being connected at its edge to the wall 17 of the motor gear box (not shown). The wall 17 is made of a suitable magnetic material and abuts the pole piece 13. Abutment means shown as a pin 18 is mounted on the pole piece 15 adjacent one of the poles 16 and extends therefrom in a direction away from the coil 11. It should be understood that the abutment means is not limited to the single pin 18 as will be further described.

A bearing 19 is mounted on the wall 17 and extends therefrom axially within the circular series of salient stator poles 14 and 16. The rotor assembly or means 20 is provided with a shaft 26 which is supported by the bearing 19 for rotation on the central axis of the stator assembly 10. One end of the shaft 26 is provided with a circular cam member 27 having a leg portion 28 and being axially spaced from the end of the bearing 19. The other end of shaft 26 extends into the motor gear box (not shown) and is provided with the usual pinion (not shown which meshes with one end of the usual gear train (not shown).

The rotor assembly 20 also is provided with a permanent magnet rotor of any suitable construction which provides an annular face in spaced relationship within the salient stator poles 14 and 16. The annular rotor face generally is of a permanent magnet material with a series of polarized segments or areas each being of a polarity opposite to the polarity of the adjacent segments or areas as shown in U.S. Pat. No. 3,164,734 which issued Jan. 5, 1965 to R.A. Heinzen.

In this instance, as best shown in FIG. 4, the rotor member is formed by an annulus 21 of magnetic material for providing the magnetic face and a rotor disc or end wall 22 connected thereto which is rotatable on the shaft 26 and is retained against axial movement between the end of the bearing 19 and the cam 27.

A cam follower or stop member 24 is mounted on a pivot 23 which is connected to and extends from the rotor disc 22. The cam follower or stop member 24, preferably made of a material with at least some degree of resiliency, has a shorter blunt portion on one side of the pivot 23 and a longer tapered portion on the other side of the pivot which terminates with a contact end 25.

The motor, as shown in FIG. 1, is in its unenergized or static condition in which the shaft 26 and its cam 27 are held against rotation by the load to be driven, and the rotor member 21/22 is held against rotation by permanent magnet flux with the rotor pole areas substantially aligned with the salient stator poles 14 and 16. Upon energization of the coil, the rotor member 21/22 can start rotating either clockwise or counterclockwise depending upon the initial half cycle of the A.C. current. The motor, as shown, is arranged for counterclockwise rotation. For desired clockwise rotation, the position of the cam follower or stop member 24 would merely be reversed during assembly.

Figure 2:
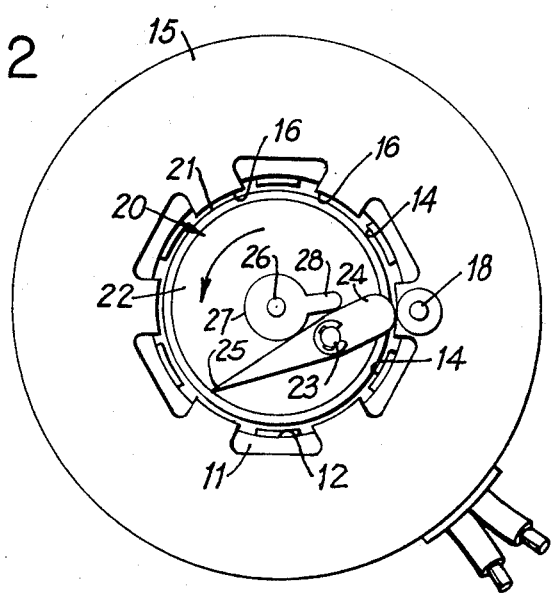

When the rotor member 21/22 starts to rotate in the desired direction, counterclockwise, the blunt end of the cam follower 24 is moved into contact with the leg portion 28 of the cam causing the follower to pivot until its tapered portion engages the circular body portion of the cam, as shown in FIG. 2. Contact of the cam 27 and cam follower 24 on both sides of the pivot 23 keeps the follower locked in position and provides a driving connection between the rotor 21/22 and the shaft 26. The rotor 21/22 can be driven in this direction because the contact end 25 of the follower is retracted or positioned radially inwardly of the abutment means 18.

Figure 3:
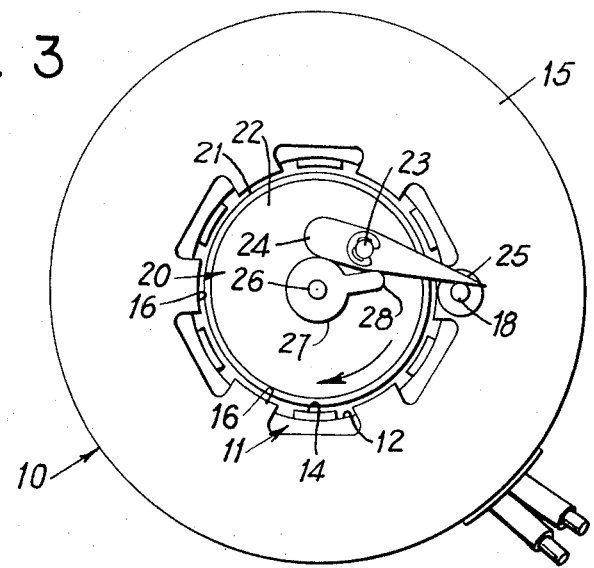

If instead, the rotor 21/22 commenced rotation in the undesired direction, the tapered end of the follower member is moved into contact with the leg portion 28 of the cam 27. This causes the follower to pivot until its blunt end contacts the circular body of the cam 24 which moves the contact end 25 of the follower member radially outwardly from the shaft 26 or the axis of rotation of the rotor 21/22. The double contact between the cam 27 and the follower member 24 again locks the follower member against movement on its pivot 23. This time, however, the contact end 25 of the follower member 24 is in its extended position. The rotor 21/22 will continue to rotate clockwise only until the contact end 25 of the follower member 24 engages the abutment 18, as shown in FIG. 3. The rotor 21/22 will then reverse its direction of rotation. By making the cam follower member 24 of a material with a degree of resiliency, impact shock of the contact end 25 engaging the abutment means 18 will be reduced and a spring-back force will be provided to assist the rotor 21/22 in reversing its direction of rotation.

Figure 5:
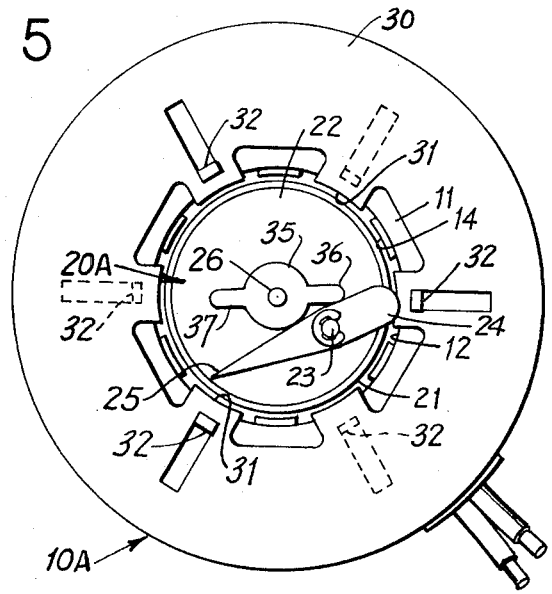
FIGS. 5 and 6 are plan views corresponding to FIGS. 2 and 3, respectively, illustrating modifications of the invention.
Figure 6:
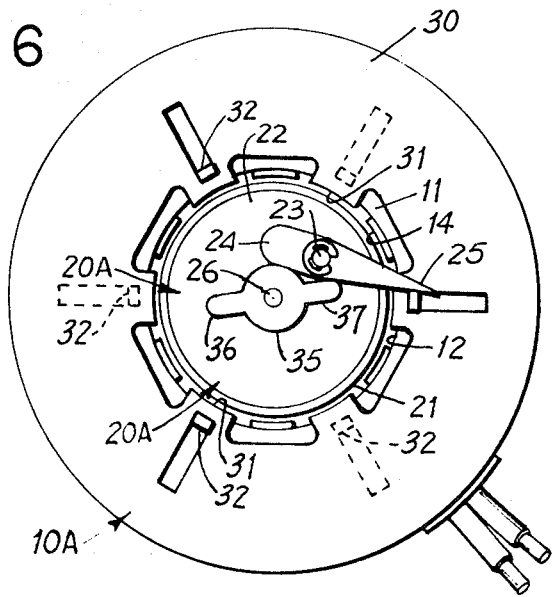

A motor in accordance with the present invention having a modified stator means 10A and a modified rotor means 20A is shown in FIGS. 5 and 6. The modified stator means 10A is now provided with a pole piece 30 having stator poles 31 and corresponding to the pole piece 15 with stator poles 16. In place of the single pin abutment means 18, a plurality of abutment fingers 32 are stamped out of the pole piece 30. It should be understood that one or a plurality of abutment means surfaces either pins 18 or fingers 32, may be provided. Of course, when a plurality of abutment means surfaces are provided, they should preferably be equally spaced from one another. The greater the number of abutment surfaces provided, the smaller is the maximum possible distance of travel of the rotor 21/22 in the undesired direction after the cam follower 24 is locked in its extended position.

The modified rotor means 20A is provided with a cam 35 with a pair of diametrically opposed legs 36 and 37 in place of the cam 27 with its single leg 28. It should be seen that the leg 36 causes the follower member 24 to pivot to its retracted position and leg 37 causes the follower member to pivot to its retracted position. This substantially reduces the maximum possible lost motion between the rotor 21/22 and the shaft 26. This distance can be varied by changing the angular relationship of the legs 36 and 37.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A synchronous permanent magnet A.C. motor having stator means with abutment means, and rotor means comprising a rotor shaft mounted for rotation on the central axis of said stator means;

a cam fixed on said shaft and having a radially extending leg portion projecting outwardly from the shaft;

a permanent magnet rotor member mounted on and rotatable relative to said shaft;

an elongated stop member pivotably mounted between its ends on said rotor member for pivotal movement about an axis parallel to said central axis;

said stop member being movable on its pivot between a retracted position which permits the rotor member to freely rotate and an extended position in which an end of the stop member engages said abutment means, thereby preventing said rotor member from rotating;

said stop member engaging the leg portion of said cam upon rotation of said rotor in an undesired direction to position the stop member to its extended position, and engaging the leg portion of said cam upon rotation of the rotor in a desired direction to position the stop member to its retracted position;

said cam including a second portion which together with said leg portion engages said stop member on both sides of its pivot when said rotor is rotating in the desired direction thereby retaining the stop member in its retracted position and interlocking said rotor member and shaft for rotation in unison.

2. The synchronous permanent magnet A.C. motor in accordance with claim 1, wherein said stop member includes a longer contact end portion and a shorter second end portion disposed, respectively, on opposite sides of the pivotal axis of the stop member, said leg portion of the cam, the lengths of said two end portions of the stop member and the location of said pivotal axis being so proportioned that the leg portion of the cam contacts the longer contact end portion when the rotor member rotates in the undesired direction and contacts the shorter second end portion when the rotor member rotates in the desired direction.

3. The synchronous permanent magnet A.C. motor in accordance with claim 1, and said cam having two legs angularly spaced from one another, each extending radially from the axis of rotation of said shaft; and one of said leg portions engaging and causing said stop member to pivot to its extended position and the other leg portion engaging and causing said stop member to pivot to its retracted position.

4. The synchronous permanent magnet A.C. motor in accordance with claim 1, and
said abutment means being provided with at least one surface to be engaged by said stop member.

5. The synchronous permanent magnet A.C. motor in accordance with claim 1, and
said abutment means being provided with a plurality of surfaces to be engaged by said stop member; and
said surfaces being angularly spaced equally one from the other.

6. The synchronous permanent magnet A.C. motor in accordance with claim 1, and
said stop member being made of a material with a limited amount of resiliency providing a force urging said rotor to rotate in the opposite direction after said stop member engages said abutment means.

* * * * *